United States Patent [19]

Van Doren et al.

[11] Patent Number: 5,761,731
[45] Date of Patent: Jun. 2, 1998

[54] METHOD AND APPARATUS FOR PERFORMING ATOMIC TRANSACTIONS IN A SHARED MEMORY MULTI PROCESSOR SYSTEM

[75] Inventors: Stephen R. Van Doren; Denis Foley, both of Shrewsbury, Mass.; David M. Fenwick, Nashua, N.H.

[73] Assignee: Digital Equipment Corporation, Maynard, Mass.

[21] Appl. No.: 859,462

[22] Filed: May 19, 1997

Related U.S. Application Data

[63] Continuation of Ser. No. 372,526, Jan. 13, 1995, abandoned.

[51] Int. Cl.$^6$ ................................................. G06F 12/02
[52] U.S. Cl. ........................ 711/155; 711/3; 711/145; 711/211; 711/147
[58] Field of Search .......................... 711/130, 3, 155, 711/145, 147, 211; 395/827, 672

[56] References Cited

U.S. PATENT DOCUMENTS

| | | | |
|---|---|---|---|
| 4,455,602 | 6/1984 | Baxter, III et al. | 395/825 |
| 4,652,994 | 3/1987 | Hattori et al. | 711/148 |
| 4,977,498 | 12/1990 | Rastegar et al. | 711/128 |
| 5,067,071 | 11/1991 | Schanin et al. | 395/293 |
| 5,327,570 | 7/1994 | Foster et al. | 395/800.3 |
| 5,388,222 | 2/1995 | Chisvin et al. | 711/154 |
| 5,412,788 | 5/1995 | Collins et al. | 711/157 |
| 5,446,862 | 8/1995 | Ohkami | 711/100 |
| 5,499,356 | 3/1996 | Eckert et al. | 711/152 |
| 5,548,780 | 8/1996 | Krein | 395/825 |

*Primary Examiner*—Matthew M. Kim
*Attorney, Agent, or Firm*—Joanne N. Pappas; Gary E. Ross; Arthur W. Fisher

[57] ABSTRACT

A mechanism for ensuring the accurate and timely completion of atomic transactions by multiple nodes coupled to a memory via a common interconnect in a multiprocessor system includes a plurality of nodes coupled to a bus, the plurality of nodes including memory nodes, I/O nodes, and processor nodes. The memory nodes are each apportioned into a plurality of banks and together comprise the memory. Associated with each bank is a busy signal, indicating the availability of the bank of memory for transactions. A node may issue an atomic transaction to a block of memory data through the use of READ_BANK_LOCK and WRITE_BANK_UNLOCK instructions. The node executing the atomic transaction monitors the state of the busy signals of the banks, and when the bank is available, the node issues a READ_BANK_LOCK instruction, which sets the busy bit to indicate the unavailability of the bank. Upon the completion of the READ_BANK_LOCK instruction, the node issues a WRITE_BANK_UNLOCK instruction. The WRITE_BANK_UNLOCK instruction updates memory with the modified data and the bank busy bit is set to indicate availability of the bank to other nodes on the bus.

14 Claims, 4 Drawing Sheets

METHOD AND APPARATUS FOR PERFORMING ATOMIC TRANSACTIONS IN A SHARED MEMORY MULTI PROCESSOR SYSTEM

This application is a continuation of application Ser. No. 08/372,526, filed Jan. 13, 1995, now abandoned.

BACKGROUND OF THE INVENTION

The invention relates generally to multiprocessor computer systems, and more particularly a method and apparatus for efficient data coherency in multiprocessor computer systems.

As it is known in the art, multiprocessor computer systems generally include one or more 'nodes' coupled together via a system bus. The 'nodes' are system components and may include processor nodes, I/O nodes, and memory nodes. I/O nodes provide a data path between memory and various I/O devices such as hard disk drives and network interfaces. Memory nodes combine to form a central data store. The central data store is accessible by all nodes in the multiprocessor computer system as well as by I/O devices coupled to the I/O node, and other multiprocessor systems coupled to the I/O node via a network interface. A system, as described above where a plurality of processor nodes, I/O nodes and memory nodes are coupled together via a common system bus is hereinafter referred to as a common bus multiprocessing system.

Each memory node includes a memory array comprising a plurality of dynamic RAM devices. The memory array is subdivided into a number of separately addressable banks of memory, with each bank of memory comprising a number of the dynamic RAM devices. Each bank of memory is further subdivided into a number of blocks, where each block of memory comprises a certain number of bytes. Memory is configured such that each uniquely addressable block of memory is allocated to only one bank of memory in the memory node.

Even though each bank is subdivided into a plurality of blocks of data, many operations by a processor or an I/O device only seek to modify a discrete number of bytes and not an entire block of data.

The common bus of the multiprocessing system is temporally divided into a plurality of 'command slots'. A command slot is a period of time during which a node coupled to the common bus may provide a command onto the bus. Data is moved between nodes by means of READ and WRITE commands. For example, when a processor or an I/O node requires a piece of data from a memory node, it drives a READ command to one of the command slots of the system bus. If a processor or an I/O node needs to return modified data to a memory node, the node drives a WRITE command to one of the command slots of the system bus.

Some multiprocessing systems operate under a READ-ALLOCATE type of protocol. According to a READ-ALLOCATE protocol, each node that seeks to modify data in memory must issue a READ command, to obtain an entire block of memory data at the modified data address, before issuing a WRITE command. Upon the completion of the WRITE command, the modified data is incorporated into the most recent copy of the block of memory data.

Access to the common system, bus for the READ and WRITE commands is controlled by a system arbiter. Before a node may access the system bus, it must first issue a request for the next system bus command slot to the system arbiter. The request is typically in the form of a request wire associated with the requesting node. One or more nodes may assert their request wire for access to any given command slot on the bus. The system arbiter determines which of the requesting nodes is to be granted the command slot. In multiprocessor systems, the determination over which node is granted access is typically implemented such that each node has equal access to the system bus. Some arbitration schemes that are known in the art to grant equal access include 'Round Robin' arbitration and 'Rotating Priority' arbitration.

In a READ-ALLOCATE system, a problem arises when a WRITE command is issued to a block from some node in between the READ portion and the WRITE portion of a READ/WRITE pair initiated by a different node to modify the same block of data. If the WRITE command updates data in the memory block, then the data received during the READ operation of the READ/WRITE pair is inconsistent with the state of the block as updated by the WRITE. When the WRITE command of the READ/WRITE pair updates memory with the block of data and its modified longword, it will overwrite the update provided by the interspersed WRITE command. As a result, the memory contains stale data.

One mechanism which is used to overcome the above problem is an atomic READ/MODIFY/WRITE operation. An atomic READ/MODIFY/WRITE operation consists of a system bus READ of a given memory block, followed by a system bus WRITE of modified data back to the aforementioned memory block, from the aforementioned node, where the 2 separate system bus operations behave as a single, logically indivisible transaction with respect to the memory block. For a READ/WRITE pair to be atomic, no intervening READs or WRITEs from other nodes can be issued between the atomic READ and the atomic WRITE to the same block.

Atomic transactions have a variety of applications in multiprocessing computer systems. One application in which atomic transactions are used is in performing data modification on nodes that do not implement caches. I/O nodes, for example, typically do not implement caches. If a non-cached I/O node reads a block of data for the purpose of modification, it must issue a system bus WRITE to complete the modification of the block, since it typically does not include a cache and therefore cannot drive data in response to subsequent system bus READs of the block. If another node issues a READ of the aforementioned block of data before the I/O node can issue its WRITE of modified data to the memory bank, the I/O node cannot respond without corrupting memory data. If another node issues a WRITE to the aforementioned block before the I/O node can issue its WRITE of modified data to a memory bank, the I/O node is left holding stale data and unable to complete its data modification correctly without re-issuing a READ of the data block. An atomic READ/MODIFY/WRITE from the I/O node would force any intervening node to hold its READ or WRITE of the data block until the I/O node could complete is WRITE back to a memory bank, thereby allowing the I/O node to complete its data modification.

In systems where only one node needs to execute atomic transactions, the system arbiter is typically used to provide atomic transactions from separate READs and WRITEs. In such systems, the node executing atomic transactions is assigned a special request wire for signalling the arbiter that it requires a bus command cycle. The special request wire is given priority over all other request wires in the system, regardless of the state of priorities in the equal access arbitration protocol. Thus when the node asserts this special request wire, it is guaranteed access to the next command slot on the bus. After the node is granted access to the bus for the READ portion of an atomic READ/MODIFY/ WRITE, it immediately re-asserts the special, high priority request wire, to request a command slot for the WRITE portion of the atomic READ/MODIFY/WRITE transaction. While the memory bank is executing the READ, it is busy and no WRITES may be issued to the bank. As soon as the memory bank has completed the READ, the special, high priority request wire guarantees that the node issuing the atomic transaction will get access to the next command slot on the bus for issuing the WRITE command. Thus the transaction is completed without interference from intervening requests from other nodes.

This methodology is effective in systems where only one node need execute atomic READ/MODIFY/WRITE transactions. However, in a system where multiple nodes may need to execute atomic transactions (for example, a system with multiple I/O nodes), the above technique is ineffective since there can only be one highest priority request. Once an attempt is made to prioritize the transactions, there exists a potential for intervening operations to corrupt memory data. Thus it would be desirable to develop an arbitration scheme which would guarantee data coherency in a system where multiple nodes require atomic transactions.

SUMMARY OF THE INVENTION

In accordance with one aspect of the present invention, a method for ensuring completion of atomic transactions by a plurality of nodes coupled to a memory via a common interconnect includes the steps of providing exclusive access to one of a plurality of banks of the memory by one of the plurality of nodes by issuing a set of commands from said one of said plurality of nodes to the common interconnect. According to another aspect of the invention an apparatus for maintaining data coherency in a multiprocessor system includes a plurality of nodes coupled to a bus, the plurality of nodes including a plurality of memory nodes, the memory nodes comprising a memory apportioned into a plurality of banks, and means, responsive to signals on the bus, for providing exclusive access to a selected one of the banks of the memory by one of said plurality of nodes through the use of a set of instructions issued by said one of the nodes, the effect of the set of instructions to preclude access to the selected one of the banks of memory by other ones of the plurality of nodes. With such an arrangement, a node coupled to the bus of the multiprocessor system may obtain atomic access to data from one bank of memory while other banks of memory continue to be accessed by other nodes of the multiprocessor system. Such an arrangement is particularly advantageous in a multiprocessor system comprising multiple I/O nodes because it allows for atomic transactions by multiple nodes on the system bus without corrupting memory data.

DETAILED DESCRIPTION OF THE PREFERRED EMBODIMENT

Figure 1:
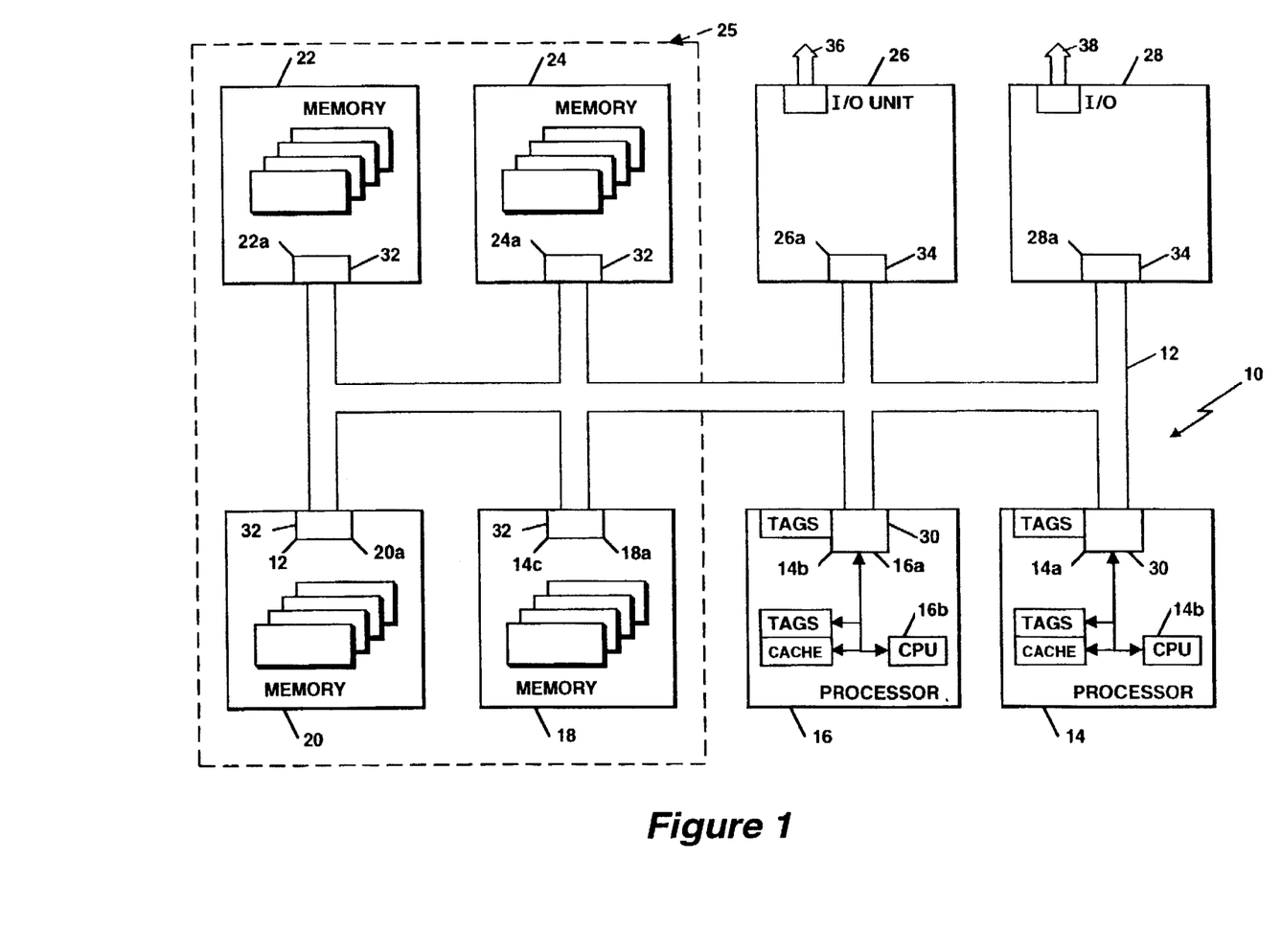
FIG. 1 is a block diagram of a multi-node computer system interconnected by a system bus having an address bus and a separate data bus.

Referring now to FIG. 1, there is shown an example of a multi-processor computer system 10 embodying the present invention. The computer system 10 includes a system bus 12 which is a pipelined, non-pended, synchronous bus facilitating communication between several system bus 'nodes', where a node is defined as a hardware device connected to the system bus. According to the preferred embodiment, three types of nodes, processor nodes, memory nodes and I/O nodes, may be coupled to the system bus 12 in varying configurations. These configurations can be comprised of up to seven processor nodes, up to seven memory nodes and up to five I/O nodes, wherein the configuration always includes at least one processor node, one memory node and one I/O node and includes at most nine total nodes.

FIG. 1 illustrates one possible configuration wherein the system comprises two processor nodes, 14 and 16, four memory nodes, 18, 20, 22 and 24, and two I/O nodes, 26 and 28.

Memory Nodes

All memory nodes 18–24, in a given system combine to form a system main memory 25, shown outlined in dashed lines in FIG. 1. The system main memory 25 is the central store of instruction and operative data for the computer system.

Figure 2:
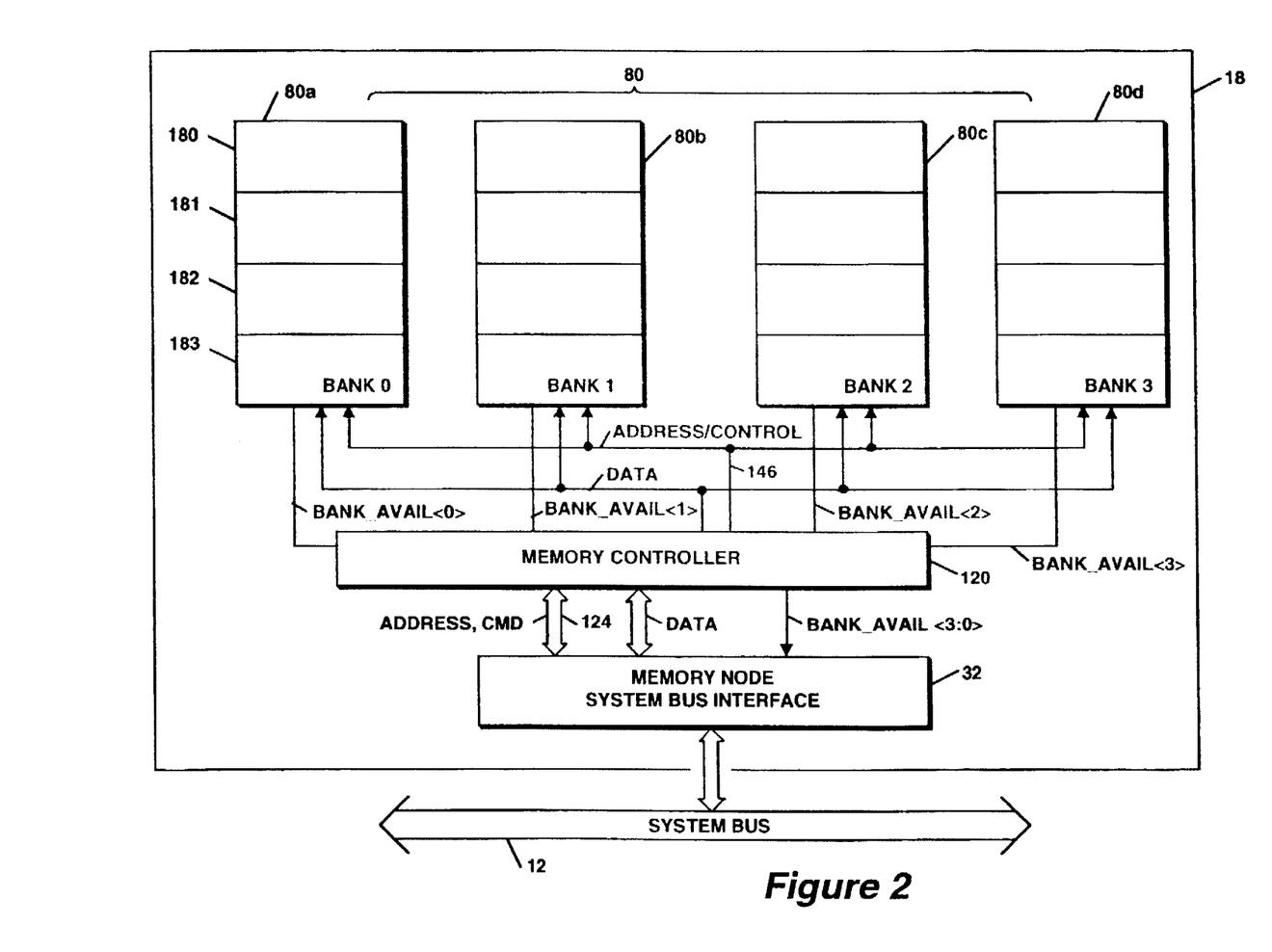
FIG. 2 is a block diagram of a memory node coupled to the system bus of the multiprocessor system of FIG. 1.

Referring now to FIG. 2, a block diagram of one of the memory nodes 18 of the system 10 in FIG. 1 is shown in detail. Each memory node stores a unique subset of data from the system main memory 25. Each memory node is comprised of a plurality of 'banks', 80a–80d of Dynamic RAM (DRAM) devices, wherein each bank of DRAMs stores a unique subset of data from the node's main memory subset. All DRAMs within a given bank share common address and data interconnect resources. Memory banks are further apportioned into a plurality of unique 'data blocks', 180–183, also referred to hereinafter as 'cache blocks' or simply 'blocks'. This arrangement maps every unique data address generated by processor or I/O nodes to one and only one memory block in one bank of one node.

According to the preferred embodiment, system bus 12 is capable of supporting up to 16 memory banks with up to 4 memory banks per memory node. According to the preferred embodiment the data block size is 64 bytes.

I/O Nodes

I/O nodes (such as nodes 26 and 28 of FIG. 1) interface system bus 12 to I/O busses such as Futurebus+, XMI and PCI Local Bus. These busses can bridge the system to more busses, networks and mass storage devices such as disks and tapes. When an I/O device 26 reads or writes data to or from system main memory, the reads and writes are channeled through the I/O nodes. I/O devices may desire to modify only a portion of data and not the entire 64 byte block.

Typically the address space of a computer system is broken down into system address space and I/O address space. Addresses that map to system address space are generally those addresses associated with processor nodes and memory nodes. Addresses that map to I/O address space are generally those addresses for accessing external I/O devices coupled to the I/O bus of an I/O device. Where there are a number of I/O nodes, each I/O node is allocated a portion of I/O address space for accessing I/O devices coupled to that node.

Figure 3:
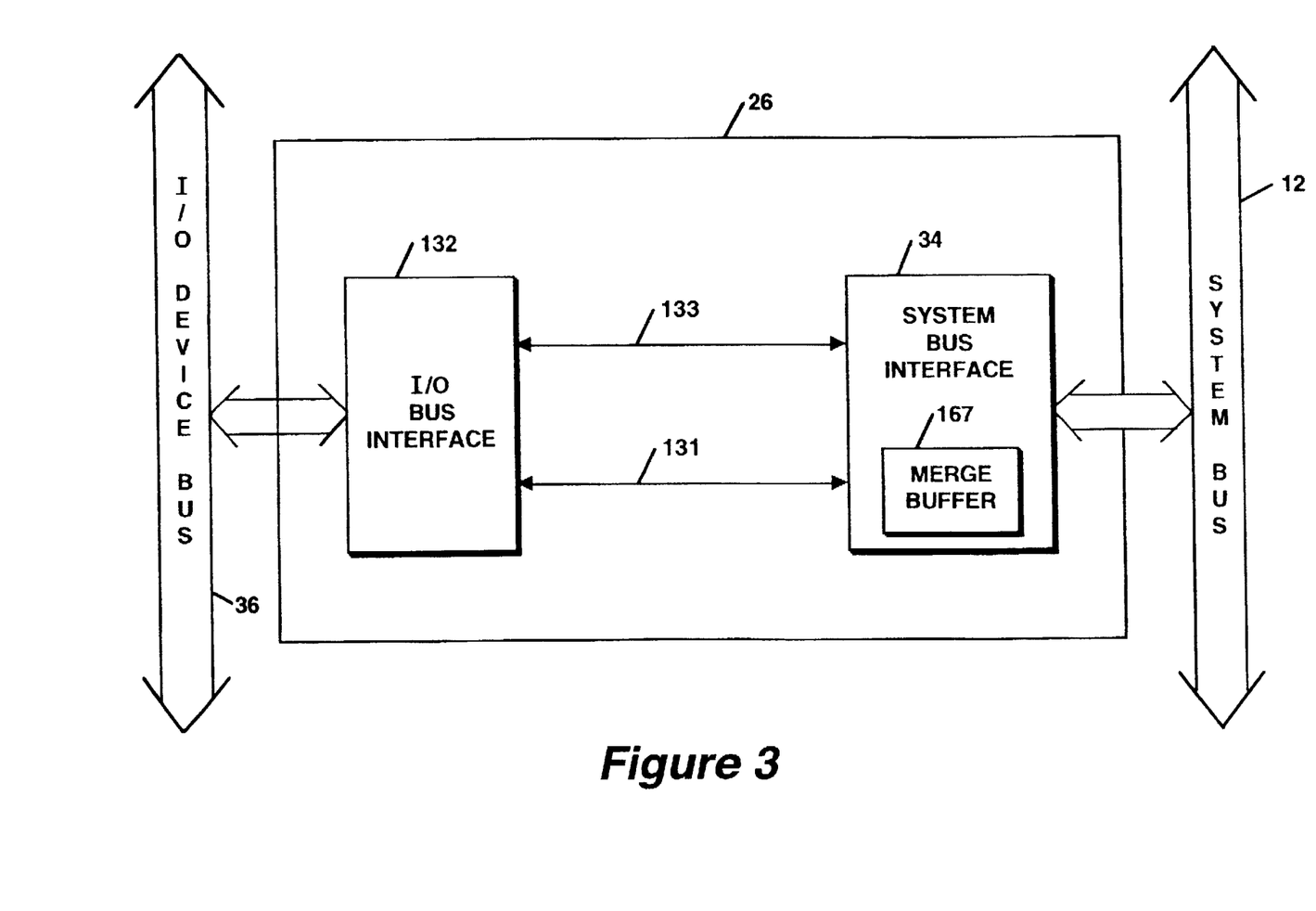
FIG. 3 is a block diagram of an I/O node coupled to the system bus of the multiprocessor system of FIG. 1.

Referring now to FIG. 3, I/O node 26 is shown to include an I/O bus interface 132, and system bus interface 34, which includes merge buffer 167. System bus interface 34 implements the command and data interface between system bus 12 and I/O module 26. Similarly, I/O bus interface 132 implements the command and data interface between I/O module 26 and I/O device bus 36.

System bus interface 34 monitors system bus 12 for system bus operations targeting the I/O address space allocated to devices coupled via I/O bus 36 to I/O node 26. It forwards system bus command/address information across bi-directional I/O command/address bus 131 to I/O bus interface 132. The I/O bus interface 132 translates the system bus operations into I/O device bus operations. Data associated with each system-to-I/O operation is transferred between the system bus interface 34 and I/O device interface 132 via bi-directional I/O data path 133. System bus-to-I/O device bus operations include reads and writes of I/O device Control and Status registers (CSRs) as well as accesses to "memory-like" storage implemented off of the I/O device bus 36.

I/O bus interface 132 monitors I/O device bus 36 for I/O device bus operations targeting the address space of system bus 12. It forwards I/O device bus command/address information across I/O command/address data path 133 to system bus interface 34. The system bus interface 34 translates the I/O device bus operations into system bus operations. Data associated with each I/O device bus-to-system bus operation is transferred between the I/O bus interface 132 and system bus interface 34 across I/O data path 133. I/O device bus-to-system bus operations include writes of system bus CSRs and DMA reads and writes of data to/from system bus memory. Note that DMA writes of system bus memory are performed by means of merge buffer 167 (to be discussed later).

Processor Nodes

Referring again briefly to FIG. 1, processor nodes 14 and 16 interface microprocessors 14*b* and 16*b* to system bus 12. Microprocessors 14*b* and 16*b* each execute instructions and manipulate data. They are supported by local, high speed cache memories.

FIG. 3 shows a processor node having two processors, 68 and 70. Each processor, 68 and 70, includes a microprocessor, 69 and 71 respectively. Each processor, 68 and 70, includes a cache subsystem, 72 and 74 respectively, coupled to corresponding microprocessors 69 and 71. The microprocessors, 69 and 71, communicate with system bus 12 by means of bus interface 30, for the purposes of transmitting and receiving commands and data.

The microprocessors, 69 and 71, on each processor node, 14 or 16, manage their caches according to a Write-Invalidate, Read-Allocate, Write-Through cache coherency algorithm known in the art. In response to this algorithm, each microprocessor, 69 and 71, issues commands to bus interface 30, which translates the commands into system bus operations. Microprocessor-to-system operations include memory reads resulting from cache misses, memory writes resulting from modifications to shared cache blocks, or evictions of modified cache blocks.

System Bus

As seen in FIG. 1, according to the principles of the invention, the system bus 12 provides a communication link between all nodes in system 10. Each node communicates with the other nodes by means of "system bus operations" (or "operations"). Operations are defined as complete logical tasks performed on the system bus 12. Operations consist of a command/address transfer, followed by a data transfer, where the command/address transfer determines the source and/or destination of the data transfer.

According to the preferred embodiment, the system bus 12 is comprised of two distinct busses: an address bus, for propagating command/address transfers, and a data bus, for propagating data transfers. Both address and data busses are temporally divided into "slots", where a slot is a period of time during which a node may exclusively drive a command/address or data onto its respective bus. Each system bus operation consists of an address bus slot, which is followed by an associated data bus slot. Exclusive access to the address bus slot of each system bus operation is provided by means of an arbitration mechanism (to be explained later). According to the preferred embodiment, exclusive access to data bus slots is granted such that the data transfers for each operation occur in the same order as their command/address transfers.

The periods of time allotted to address bus slots and data bus slots are multiples of the system bus clock cycle time. A system bus clock cycle (or just "cycle") is the period required for one oscillation of the system bus clock signal, CLK. In accordance with the preferred embodiment, an address bus slot comprises 2 clock cycles and a data bus slot comprises 3 clock cycles.

The address bus portion of the system bus 12 comprises the following signal lines: REQ8HI, REQ8LO, REQ<7:0>, ARB_SUP, CMD<2:0>, ADDRESS<39:5>, BANK<3:0>, CMD_ACK and BANK_AVL<15:0>.

System Bus Operations

The CMD<3:0> lines of the system bus address define a set of operations available to nodes on the system bus 12. Table I lists the CMD<3:0> encodings and their descriptions.

TABLE I

| Command | CMD<2:0> | Description |
|---|---|---|
| 1. NOP | 000 | Nulled command |
| 2. Victim | 001 | Victim eviction |
| 3. Read | 010 | Memory read |
| 4. Write | 011 | Memory write |
| 5. Read Bank Lock | 100 | Read memory bank, lock |
| 6. Write Bank Unlock | 101 | Write memory bank, unlock |
| 7. CSR Read | 110 | Read CSR data |
| 8. CSR Write | 111 | Write CSR data |

The CSR Read and Write operations are used to read and write system bus CSR data, as well as I/O device CSRs and "memory-like" I/O storage. These classes of data are not stored in system main memory.

The READ, WRITE and VICTIM commands are used to read and write data from/to system main memory. The READ command is used by processor nodes to READ data as a result of a cache miss. The READ command is used by I/O nodes to perform Direct Memory Access (DMA) writes from memory to an I/O device. The WRITE command is used by processor nodes to modify data in a cache block that is shared between two or more processor nodes. The WRITE command is also used by I/O nodes to write data from I/O devices to memory. The VICTIM command is used by processor nodes to write modified blocks of data in their respective caches back to memory before the contents of the cache location are overwritten as a result of a READ command.

The READ, WRITE and VICTIM commands always operate to access data stored in the main system memory 25 (i.e. in one of the memory nodes). Although some READ, WRITE and VICTIM commands may actually move data directly from one processor cache to another, and therefore require no memory node access, one memory bank (or a part there of) will always be cycled through a read or write sequence for each system bus operation.

The READ_BANK_LOCK and WRITE_BANK_UNLOCK commands are also used to read and write data to/from system main memory. These commands are used very much like the READ and WRITE commands, except that, according to the preferred embodiment, they are special commands used by I/O nodes to perform DMA writes of data blocks whose size is less than the size of a memory (cache) block. DMA writes are known to one of skill in the art to include a sequence of back to back write operations, each of which access successive locations in memory.

Each system bus operation includes the following steps. For each command/address transfer, the node initiating the operation drives command/address data onto the CMD<3:0>, ADDRESS<39:5>, and BANK<3:0> lines of the address portion of system bus 12. The CMD<3:0> field is driven with one of the system bus operation encodings described above in Table I. The ADDRESS<39:5> field is driven with the physical address of the system main memory block or I/O address associated with the system bus operation.

For system bus operations addressing system main memory, the BANK<3:0> lines are driven with a unique bank number associated with the memory bank into which the addressed data block is mapped. For system bus operations addressing I/O space, the BANK<3:0> lines are used to support I/O specific functions as will be described in further detail below.

Two cycles after each address bias slot in which a command is driven, the CMD_ACK command acknowledge signal is expected to be asserted by the node that is to respond to the command. The assertion of CMD_ACK indicates proper transmission of the command and receipt of the command at the destination node. The absence of the CMD_ACK assertion typically indicates a system bus error.

System Bus Arbitration

Eight of the nine possible nodes in system bus 12 are uniquely associated with one each of the REQ<7:0> request signals. The ninth node is associated with the REQ8HI and REQ8LO request signals. When any of the nodes requires access to the system bus 12 for the purpose of a system bus operation, the node asserts its request signal. Two cycles prior to each address slot on the address bus, system arbitration logic evaluates the state of all the request signals to determine which node should drive a command/address transfer in the associated address bus slot.

If a node is trying to issue a READ or WRITE command to a main memory bank, it can only assert its request signal if the bank is not busy servicing another command from another node. By allowing each bank to be accessed by only one node at a given time, the DRAMs within a given bank are able to share common address and data interconnect resources. To provide control over the accesses of each memory bank, each bank in system 10 is assigned one of the address bus BANK_AVL<15:0> bank available signals. Whenever a memory bank is executing a DRAM READ or WRITE cycle in response to a system bus READ, READ_BANK_LOCK, WRITE, WRITE_BANK_UNLOCK, or VICTIM command, it asserts its associated BANK_AVL<15:0> signal for the duration of the DRAM cycle. The processor and I/O nodes, meanwhile, monitor the BANK_AVL<15:0> signals and, if they are trying to issue operations to a busy bank (i.e. a bank with its associated BANK_AVL line deasserted), they will deassert (or withhold the assertion of) their associated request signals.

For example, referring again briefly to FIG. 1, assume that each of the memory nodes 18, 20, 22 and 24 each comprise 4 unique banks of memory. BANK_AVL<3:0> is assigned to the 4 banks of memory in node 18. BANK_AVL<7:4> is assigned to the 4 banks of memory in node 20. BANK_AVL<11:8> are assigned to the banks of memory in node 22, and BANK_AVL<15:9> are assigned to the banks of memory in node 24.

If processor node 14 requires a READ of an address mapped into memory bank 80a in memory node 18 (see FIG. 2), it starts processing the READ by checking the value of BANK_AVL<0>. If BANK_AVL<0> is asserted, the bank is not currently busy, and node 14 asserts its associated request line; for purposes of this example, assume node 14 corresponds to REQ<1>.

Node 14 continues asserting REQ<1>, subject to the state of BANK_AVL<0>, until it is granted access to a system address bus slot. Upon acquiring access to the bus, node 14 drives command and address data onto the system bus 12 in its acquired address bus slot. This command and address data is transmitted to memory bank 80a, which responds by asserting a CMD_ACK signal on system bus 12, and deasserting the BANK_AVL<0> signal. The assertion of the CMD_ACK signal indicates that the command was transmitted correctly and received correctly at the appropriate memory node. The deassertion of the BANK_AVL<0> signal indicates that the bank 80a is no longer available for system bus operations.

Memory bank 80a deasserts BANK_AVL<0> while it accesses read data from the memory bank 80a's DRAMs. It continues to deassert BANK_AVL<0> until bank 80a is able to return the READ data over the data portion of the system bus 12.

Any of the processor nodes, such as processor node 14 may also write to one of the banks of memory in main memory 25. To issue a WRITE to an address mapped into memory bank 80d, processor node 14 first checks the value of BANK_AVL<3> to determine whether that bank is free to accept commands. If BANK_AVL<3> is asserted, node 14 asserts its associated request line, REQ<1>. Node 14 continues asserting REQ<1>, subject to the state of BANK_AVL<3>, until it is granted access to a system address bus slot.

Upon acquiring access to the bus, node 14 drives command and address data onto the bus in its acquired address bus slot. The command and address data is transmitted to memory bank 80d in memory node 18. Memory node 18 responds to the receipt of the WRITE by asserting CMD_ACK and deasserting BANK_AVL<3>, indicating that the command was transmitted correctly and that bank 80d is no longer available for system bus operations.

Since the DRAM cycle for a WRITE operation can only partially complete prior to the transmission of data to the memory bank, BANK_AVL<3> will remain deasserted up to and beyond the transmission of data on the system bus 12. The period of time beyond the transmission of data where BANK_AVL<3> is deasserted is determined by the speed and type of DRAM devices comprising memory bank 80d, and is sufficient to allow accurate retention and storage of the data.

The preferred embodiment implements distributed arbitration logic for controlling access by each of the nodes to the system bus 12. The distributed arbitration logic is replicated on each processor and I/O node. Eight of the nine bus nodes are assigned one each of the REQ<7:0> request signals. The ninth node is assigned both the REQ8LO and REQ8HI request signals. When a node requires access to the bus, it asserts (one of) its request signal(s). The system arbiter grants bus access to one of the nodes asserting a request signal. Requests are granted based on priorities assigned to the requests signals. The REQ8LO signal is always given lowest priority. The REQ8HI signal is always given highest priority. The eight remaining REQ<7:0> signals are assigned a priority based on an equal access, rotating priority arbitration method, known in the art. The bus node associated with REQ8LO and REQ8HI is reserved for special I/O nodes to which latency sensitive I/O devices are attached.

Note that although here a distributed, rotating priority arbitration mechanism is described, it is not a requirement. To provide maximal performance, all that is required is an equal-access arbitration mechanism.

A system according to the invention also includes the ARB_SUP arbitration suppression signal to allow system nodes to suppress command issuance to the system bus 12. When the ARB_SUP signal is asserted, nodes may continue to request the bus by asserting their corresponding REQ<> signals, but the arbitration logic will NOT grant any of the nodes access to the bus.

Sub-Block Writes/Atomic Transactions

An I/O device may issue a WRITE on an I/O device bus that translates into a WRITE to system main memory 25 on system bus 12. Often, for an I/O write, the size of the data block being written is less than that of the system data block size of 64 bytes. As a result, the I/O node through which the I/O device interfaces to the system bus 12 will execute an atomic Read-Modify-Write command sequence on the system bus to complete the sub-block write.

An atomic Read-Modify-Write command sequence consists of a READ on system bus 12 of a data block by a node followed by modification of the data block by the node and a system bus WRITE of the modified data block by the same node, with no intervening READ or WRITE transactions to the particular block by other nodes. By precluding access to the block by other nodes, the need for caching of the data block at the modifying node is removed.

I/O nodes typically use the Read_Modify_Write sequence to complete sub-block write transactions by reading, in atomic fashion, the full data block of which the sub-block is a constituent, updating just the sub-block to be modified, and writing the whole block back to memory. To all other nodes in the system, the atomic Read_Modify_Write command sequence appears in aggregate to be a sub-block data write.

In the preferred embodiment of this invention, I/O nodes use the READ_BANK_LOCK and WRITE_BANK_UNLOCK command encodings, as well I/O node merge buffer 167, to complete atomic Read-Modify-Write command sequences.

The READ_BANK_LOCK command works exactly like the READ command described above, except that the bank being read will keep its BANK_AVL signal deasserted after the bank has transmitted read data on the system data bus. The BANK_AVL signal will remain asserted until a WRITE_BANK_UNLOCK command is issued to the bank and is completed, or until a "bank lock" timer expires. In this embodiment the bank lock timer counts 256 system clock cycles excluding those cycles in which the ARB_SUP signal is asserted. Further, this timer may be disabled by software. The timeout of the bank lock timer results in a system fatal error.

The WRITE_BANK_UNLOCK command will always follow the READ_BANK_LOCK command in an atomic Read/Modify/Write sequence. The WRITE_BANK_UNLOCK commands operates similar to the WRITE command described above, with one exception. The exception is that it may be issued to the system bus 12 regardless of the state of the BANK_AVL line associated with the memory bank it is targeting, because that BANK_AVL signal is known to set as a result of the associated READ_BANK_LOCK command. Upon the completion of the DRAM write cycle by the WRITE_BANK_UNLOCK command, the BANK_AVL signal of the targeted bank is reasserted.

The READ_BANK_LOCK and WRITE_BANK_UNLOCK commands are used according to the following rules:

1. If a node, X, issues a READ_BANK_LOCK command to the system bus, addressing memory bank Y, the next command that node X issues to the system bus is a WRITE_BANK_UNLOCK command to the same memory bank Y.

2. The only node which may issue a WRITE_BANK_UNLOCK command to a given locked memory bank Y, is the same node that issued the READ_BANK_LOCK command that deasserted bank Y's BANK_AVL signal.

3. A node issuing a WRITE_BANK_LOCK command is responsible for ensuring that a memory bank has completed any preceding commands before issuing the WRITE_BANK_UNLOCK command.

The READ_BANK_LOCK and WRITE_BANK_UNLOCK commands, used in the above described manner, allow a node on the system bus to gain exclusive access to a bank upon reading a block from the bank, and to release the bank for general use upon writing the modified data back to the bank, by means of the existing BANK_AVL<15:0> signals and arbitration logic. The exclusion of other nodes from a memory bank between a node's READ_BANK_LOCK/WRITE_BANK_UNLOCK pair provides the atomicity required in atomic Read-Modify-Write sequences.

It should be noted that the above recited rules are required to make operable the specific embodiment of the invention described herein operable; i.e. a multi-node system with distributed arbitration between the nodes. However, one of skill in the art would recognize that adaptations may be made to the above rules to support alternative embodiments of a computing system while retaining the essence of the inventive method for providing atomic access to any bank of memory.

Figure 4:
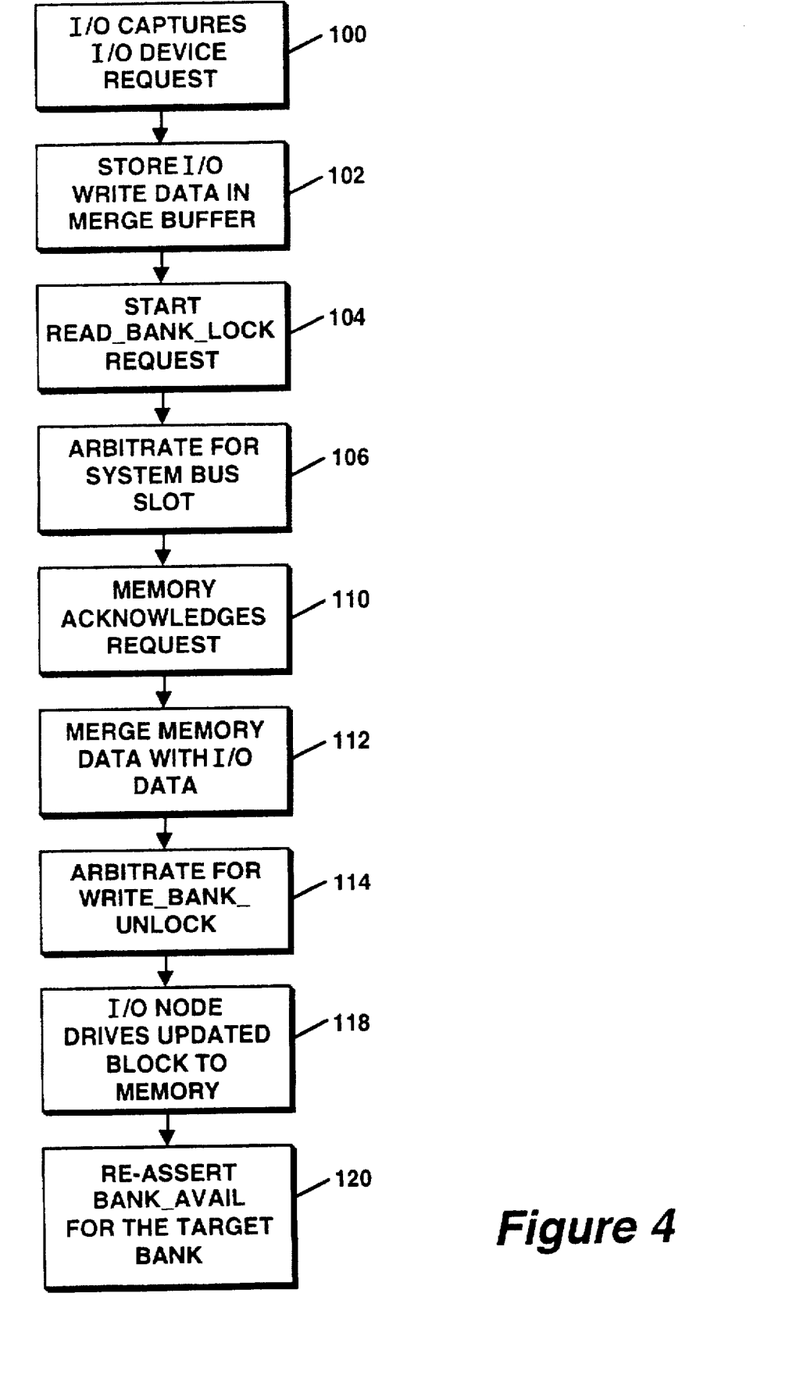
FIG. 4 is a flow diagram illustrating the operation of an atomic transaction by an I/O node in the system of FIG. 1.

Referring now to FIG. 4, a typical I/O atomic transaction will be described with reference to elements shown in FIG. 3. If an I/O device attached to node 26 issues a quadword (8 byte) WRITE on I/O device bus 36 that addresses a data block in main memory bank 80a, then I/O node 26 begins a sub-block write sequence. First, at step 100, I/O bus interface 132 on IO node 26 captures the quadword write command, address and data as it is transmitted on I/O device bus 36. The I/O device bus interface 132 then forwards the command and address information over I/O command/address path 131 to system bus interface 34. I/O device bus interface 132 also forwards the quadword of data over I/O data path 133 into merge buffer 167 in system interface 34.

Merge buffer 167 can hold one 64 byte system data block. At step 102, the quadword of write data on bus 133 is stored at the appropriate quadword location in the 64 byte block of the merge buffer according to the destination address of the quadword.

Upon receiving the command/address data from I/O bus interface 132, at step 104 system bus interface 34 begins a system bus issue sequence for a READ_BANK_LOCK command. This sequence, described in detail for the READ command above, involves, at step 106, the assertion of the request line associated with node 26, and the arbitration and the driving of the READ_BANK_LOCK command onto the system address bus.

In response to the issuance of the READ_BANK_LOCK command to the system address bus, at step 110 memory bank 80a will assert CMD_ACK and deassert its associated BANK_AVL<15:0> signal. Upon completion of the DRAM read, memory bank 80a returns a 64 byte block of data to I/O node 26 across the system data bus 12. The associated BANK_AVL<15:0> line remains asserted.

When I/O node 26 receives the read data from the system data bus, at step 112 it merges the incoming data with the quadword of write data in merge buffer 167. The data is merged so that only those quadwords of incoming data that do not map to the same data block quadword position as the quadword already in the buffer are written to the merge buffer. As a result, the modified data from the I/O device is merged into the block of memory data.

Once the read data has been merged with the write data, at step 114 I/O node 26 begins a system bus issue sequence for a WRITE_BANK_UNLOCK command, satisfying the first criteria described above for use of the READ_BANK_LOCK /WRITE_BANK_UNLOCK commands. Since memory banks would normally reassert their BANK_AVL<15:0> signal when read data was driven onto the system data bus, I/O node 26 may be certain that by the time the read data was returned, memory bank 80a was capable of servicing a WRITE_BANK_UNLOCK command. This certainty justifies the WRITE_BANK_UNLOCK issue sequence with respect to the third criteria described above for use of READ_BANK_LOCK and WRITE_BANK_UNLOCK commands.

The WRITE_BANK_UNLOCK issue sequence, described in detail for the WRITE command above, involves, the assertion of the request line associated with node 26, arbitration for access to the system bus, and the driving of the WRITE_BANK_UNLOCK command onto the system address bus. In response to the issuance of the WRITE_BANK_UNLOCK command to the system address bus, memory bank 80a asserts CMD_ACK. In response, at step 118, I/O node 26 drives the merged block of data to memory bank 80a across the system data bus.

Upon the receipt of the WRITE_BANK_UNLOCK command, memory bank 80a begins a DRAM write sequence. When memory bank 80a receives the merged data block from the system data bus 12, at step 120 it completes the DRAM write sequence. Upon completion of the DRAM write sequence, memory bank 80a reasserts its associated BANK_AVL<15:0> signal, freeing the bank for general use and completing the atomic Read-Modify- Write, sub-block write sequence.

According to the preferred embodiment, merge buffer 167, and thus I/O node 26 and system 10, supports sub-block writes as small a 1 byte.

By completing I/O sub-block writes by means of the READ_BANK_LOCK and WRITE_BANK_UNLOCK commands, data coherency is maintained without the hardware expense of a cached I/O node and without the software and performance expense of system interrupts. Further, by performing atomic transactions on a memory bank basis, the above described system can support multiple sub-block writes to different banks of memory during any given time period as well as support normal read and write traffic to other banks during an atomic sub-block write.

Although a system having a separate address and data bus has been described, the invention may also be applied to systems with other address and data configurations, such as multiplexed busses and switch based systems. Further, the arrangement provided herein should not be limited to I/O devices to a system bus. Rather, the invention provides a mechanism for ensuring the accurate and timely completion of atomic transactions by multiple nodes coupled to a memory via a common interconnect.

Having described a preferred embodiment of the invention, it will now become apparent to one of skill in the art that other embodiments incorporating its concepts may be used. It is felt, therefore, that this invention should not be limited to the disclosed embodiment, but rather should be limited only by the spirit and scope of the appended claims

What is claimed is:

1. An apparatus comprising:
   a plurality of nodes coupled to a bus, said plurality of nodes comprising a plurality of memory nodes and a plurality of commander nodes, said commander nodes for issuing commands on said bus, said plurality of memory nodes comprising a memory apportioned into a plurality of banks;
   means, responsive to a series of commands issued on said bus by one of said commander nodes, for providing exclusive atomic access to a selected one of said banks of said memory by said one commander node during execution of said series of commands; and
   wherein each of said plurality of banks of memory further comprises an availability signal, each of said plurality of banks of memory driving each said availability signal indicating the availability of an associated bank of memory for receiving commands from commander nodes.

2. The apparatus of claim 1, wherein each of said plurality of commander nodes further comprises:
   means, responsive to one of said signals, for precluding access to a bank associated with said one of said signals by commander nodes other than said one commander node.

3. The apparatus of claim 2, wherein each memory bank further comprises:
   means, responsive to the issue of a command by a commander node accessing one of said banks of memory, for setting said signal corresponding to said accessed bank by said respective bank to indicate that said bank is unavailable; and
   means, responsive to the completion of said command on said bus, for resetting said signal corresponding to said accessed bank by said respective bank to indicate that said bank is available.

4. The apparatus of claim 3, wherein said set of commands comprises a lock and an unlock command, and wherein said means for providing exclusive access to said selected one of said banks of memory further comprises:
   means, responsive to said lock command, for setting said signal corresponding to said selected one of said banks of memory by said selected one of said banks of memory to indicate that said selected bank is unavailable; and
   means for precluding said signal indicating that said bank is unavailable from being reset upon the completion of said lock command.

5. The apparatus of claim 4, further comprising:

means, responsive to the completion of a lock command, for detecting when said selected bank of memory is available to receive subsequent commands.

6. The apparatus of claim 5, further comprising:

means, responsive to said means for detecting indicating that said selected bank is available, for allowing a specific node to issue an unlock command to a bank having said available bit set to indicate that said corresponding bank is unavailable, responsive to said available bit being set by said specific node.

7. The apparatus of claim 5, further comprising:

means, responsive to said means for detecting indicating that said selected bank is available, for allowing a specific unlock command to be issued to a bank having said available bit set to indicate that said bank is unavailable, responsive to said bit being set by a lock command associated with said specific unlock command.

8. The apparatus of claim 7, wherein each of said memory banks further comprises:

means, responsive to the completion with said unlock command, for setting said signal corresponding to said selected bank by said selected bank to indicate that said selected bank is available to process subsequent commands.

9. A method for ensuring completion of atomic transactions by a plurality of nodes coupled to a memory via a common interconnect comprising the steps of:

providing, on said common interconnect, address information including bank select information and data, and availability information, driven by said memory, for indicating the availability of a plurality of banks of said memory;

providing exclusive access to one of a plurality of banks of said memory by one of said plurality of nodes for a series of instructions by issuing a set of commands from said one of said plurality of nodes to said common interconnect, said set of commands resulting in an availability signal being asserted by said one of said plurality of banks, said availability signal remaining asserted until said set of commands has been completed.

10. The method of claim 9, wherein said step of providing exclusive access further comprises the steps of:

maintaining, at said memory, a plurality of availability flags indicating the availability of a corresponding plurality of banks of said memory including the step of broadcasting said availability flags on said common interconnect by an associated memory bank;

monitoring, at each of said nodes, said plurality of availability flags to determine when one of said plurality of banks is available; and precluding, at each of said nodes, said respective node from issuing a request to a subset of said plurality of banks having their availability bit set to indicate that the corresponding bank of the subset is unavailable.

11. The method according to claim 10, further comprising the steps of:

setting, responsive to a command received at said memory for one of said plurality of banks of memory, an availability flag associated with said bank to indicate that said bank is unavailable for the duration of said received command; and resetting, responsive to said completion of said received command, said availability flag associated with said bank to indicate that said bank is available.

12. The method according to claim 11, further comprising the steps of:

issuing, from one of said nodes, said set of commands to a selected bank of memory having its availability bit set to indicate that the bank is available, where said set of commands comprises a lock command and an unlock command;

reading, responsive to said lock command, data from said selected bank of memory and returning said data to said one of said nodes; and precluding, responsive to the completion of said read of said lock command, said resetting of said availability flag associated with said selected bank.

13. The method of claim 12, further comprising the step of:

issuing, from said one of said nodes, said unlock command, said issuing further comprising the step of allowing said one of said nodes to issue said unlock command when said availability flag of said selected bank is set to indicate that said bank is unavailable, said unlock command including a write command for writing data from said one of said nodes to said memory.

14. The method according to claim 11, further comprising the step of:

notifying, responsive to said completion of said read of said lock command, said one of said nodes that said selected bank of memory is available to receive said unlock command.

* * * * *